(12) United States Patent
Lonsway (10) Patent No.: US 12,360,395 B1
(45) Date of Patent: Jul. 15, 2025

(54) SYSTEM AND METHOD OF CREATING A LAYERED OPTICAL DEVICE

(71) Applicant: Gene A. Lonsway, Chapel Hill, NC (US)

(72) Inventor: Gene A. Lonsway, Chapel Hill, NC (US)

( * ) Notice: Subject to any disclaimer, the term of this patent is extended or adjusted under 35 U.S.C. 154(b) by 0 days.

(21) Appl. No.: 19/183,480

(22) Filed: Apr. 18, 2025

(51) Int. Cl.
*G02C 7/02* (2006.01)
*B41J 2/21* (2006.01)
*B41M 1/12* (2006.01)
*B41M 1/34* (2006.01)
*B41M 3/00* (2006.01)
*G02B 1/11* (2015.01)
*G02B 1/18* (2015.01)
*G02C 7/14* (2006.01)

(52) U.S. Cl.
CPC .............. *G02C 7/021* (2013.01); *B41J 2/2114* (2013.01); *B41M 1/12* (2013.01); *B41M 1/34* (2013.01); *B41M 3/003* (2013.01); *G02B 1/11* (2013.01); *G02B 1/18* (2015.01); *G02C 7/14* (2013.01)

(58) Field of Classification Search
CPC .......... G02C 7/021; G02C 7/14; B41J 2/2114; B41M 1/12; B41M 1/34; B41M 3/003; G02B 1/11; G02B 1/18
See application file for complete search history.

(56) References Cited

U.S. PATENT DOCUMENTS

| 9,715,129 | B2 * | 7/2017 | Bowers | G02C 7/021 |
| 2015/0362757 | A1 * | 12/2015 | Fu | G02C 7/104 |
| | | | | 351/159.73 |
| 2022/0367839 | A1 * | 11/2022 | Huang | H10K 50/86 |
| 2023/0305375 | A1 * | 9/2023 | Akiyama | G03B 21/206 |

FOREIGN PATENT DOCUMENTS

JP          2016062014 A  *  4/2016  ............... G02B 1/11

* cited by examiner

*Primary Examiner* — Mustak Choudhury
(74) *Attorney, Agent, or Firm* — Ashley D. Johnson; Dogwood Patent and Trademark Law (57) ABSTRACT

The invention is a system and method used to prepare an optical device with external branding on a first surface while also ensuring internal visibility preservation. The optical device includes multiple layers that provide functional aspects to the optical device. Specifically, the optical device includes an image layer, a mirrored one-way layer, a color conversion layer, a lens, and an anti-reflective layer. The combination of the optical device layers ensures an image printed on the first surface of the device is fully visible on, while the view from the opposed second surface (e.g., the view of the user) is uninhibited by the image.

20 Claims, 8 Drawing Sheets

SYSTEM AND METHOD OF CREATING A LAYERED OPTICAL DEVICE

FIELD OF THE INVENTION

The presently disclosed subject matter relates to a system and method of creating a layered optical device. Specifically, the disclosed system and method are used to produce an optical device with a wide variety of practical applications, such as (but not limited to) optical eyewear, architectural glass, transparent displays (e.g., storefront windows, large building windows), and automotive windshields. As described in detail below, the system enables an externally visible image to be displayed on a first surface of the optical device while maintaining a uniform, neutral view for the wearer or interior observer on a second surface of the device.

BACKGROUND OF THE INVENTION

Eyeglasses include lenses attached to a frame that positions the lenses for use by a wearer. Lenses typically include at least one lens substrate made from a substantially rigid material. In some cases, one or more coatings are applied to the lens body to impart desired functional characteristics to the eyeglasses. For example, tinted coatings, mirrored layers, and polarization films can be used to reduce glare, enhance aesthetics, and/or modify light transmission. In addition, some materials enable branding or image application on the surface of the lens. For example, external branding, logos, and/or custom images can be applied. However, the image application blocks the view of a user or viewer. In addition, conventional image applications often require a power source, such as a digital display or smart glass, which can be costly. Further, prior art systems often use perforated or semi-transparent films that reduce clarity or brightness. It would therefore be beneficial to provide a system and method for applying a clear and vivid image on a first (e.g., external) surface of an optical device, while preserving an uninterrupted, neutral view from an opposed second surface of the device.

SUMMARY OF THE INVENTION

In some embodiments, the presently disclosed subject matter is directed to an optical device comprising an image layer defined by a first side that is the first surface of the optical device and an opposed second side, wherein an image is printed on the image layer first side. The optical device also includes a mirrored one-way layer defined by a first side positioned adjacent the image layer second side, and an opposed second side, wherein the mirrored one-way layer comprises a dielectric mirror coating. The optical device further includes a color conversion layer defined by defined by a first side positioned adjacent to the second side of the mirrored one-way layer, and a second side, wherein the color conversion layer comprises an additive color in the same size and shape as the image to neutralize the image. The optical device includes a lens with a first side and an opposed second side, wherein the first side of the lens is positioned adjacent to the second side of the color conversion layer. The optical device comprises an anti-reflective layer defined by a first side positioned adjacent to the second side of the lens, and a second side that is the second surface of the optical device. The image is visible from the first surface of the optical device. The image is neutralized by the additive color and is not visible from the second surface of the optical device.

In some embodiments, the optical device is selected from eyeglasses, sunglasses, windows, automobile windshields, or automobile windows.

In some embodiments, the image comprises transparent or semi-transparent ink.

In some embodiments, the transparent or semi-transparent ink is selected from transparent dye-based inks, transparent pigment-based inks, UV-curable transparent inks, hybrid inks, or combinations thereof.

In some embodiments, the inks are UV stable inks.

In some embodiments, the image is a screen printed or digital printed image.

In some embodiments, the first side of the image layer includes one or more coatings selected from a scratch resistant coating, a hydrophobic coating, an oleophobic coating, UV resistant coating, or combinations thereof.

In some embodiments, the dielectric mirror coating comprises indium tin oxide, aluminum tin oxide, indium zinc oxide, fluorine-doped tin oxide, poly(3,4-ethylenedioxythiophene) (PEDOT), germanium oxide, antimony oxide, bismuth oxide, magnesium oxide, aluminum oxide, silicon oxide, titanium oxide, silicon carbonitride, silicon nitride, silicon oxynitride, or combinations thereof.

In some embodiments, the mirrored one-way layer has a reflectivity range of about 40-50 percent.

In some embodiments, the additive color comprises transparent or semi-transparent ink.

In some embodiments, the additive color overlayed with the image creates a uniform tint.

In some embodiments, each layer has a thickness of about 0.1-10 mm.

In some embodiments, the image layer, one way mirror layer, color conversion layer, and anti-reflective layer are embedded within or laminated inside the lens.

In some embodiments, the presently disclosed subject matter is directed to a method of providing a visual image on a first surface only of an optical device. Specifically, the method comprises printing an image on the first surface of the optical device wherein the image is visible on the first surface. The color conversion layer prevents the image from being visible on the second surface of the optical device.

DETAILED DESCRIPTION OF THE INVENTION

For the purpose of promoting an understanding of the principles of the present disclosure, reference will now be made to preferred embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Articles "a" and "an" are used herein to refer to one or to more than one (i.e., at least one) of the grammatical object of the article. By way of example, "an element" means at least one element and can include more than one element. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise indicated, all numbers expressing quantities of components, conditions, and so forth used in the specification and claims are to be understood as being modified in all instances by the term "about." Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the disclosed packages and methods. Thus, the term "about" is used to provide flexibility to a numerical range endpoint by providing that a given value may be "slightly above" or "slightly below" the endpoint without affecting the desired result.

As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the drawing figures. It will be understood that these terms and those discussed above are intended to encompass different orientations of the device in addition to the orientation depicted in the drawing figures.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

All methods described herein can be performed in any suitable order unless otherwise indicated herein or otherwise clearly contradicted by context. The use of any and all examples, or exemplary language (e.g., "such as") provided herein, is intended merely to better illuminate the invention, and does not pose a limitation on the scope of the invention unless otherwise claimed. No language in the specification should be construed as indicating any unclaimed element as essential to the practice of the invention.

Unless otherwise defined, all technical terms used herein have the same meaning as commonly understood by one of ordinary skill in the art to which this disclosure belongs.

Figure 1A:
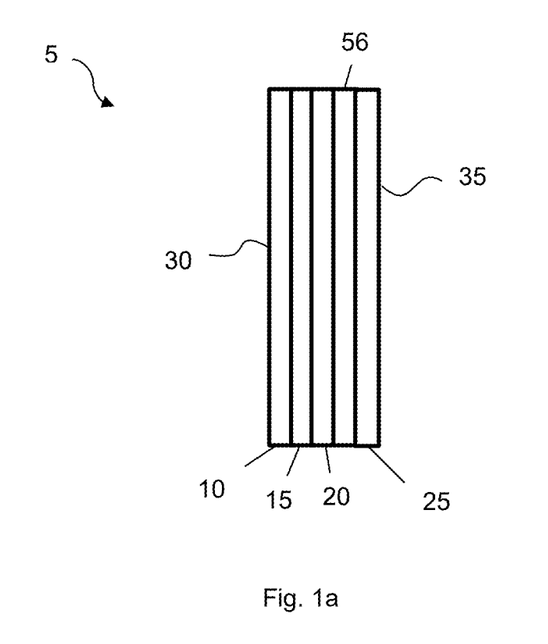
FIG. 1a is a cross-sectional view of an optical device in accordance with some embodiments of the presently disclosed subject matter.
Figure 1B:
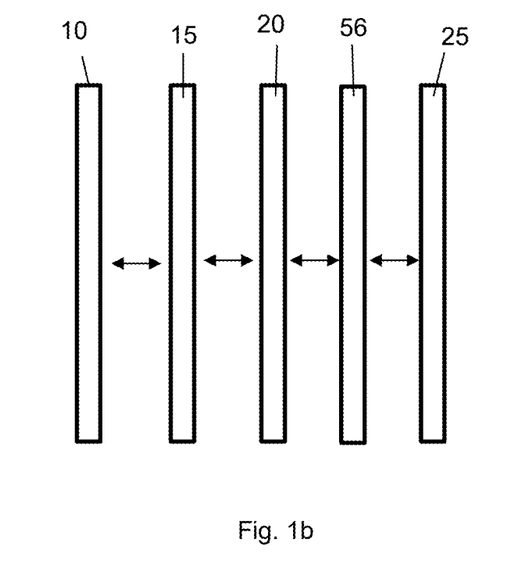
FIG. 1b is an exploded view of the optical device of FIG. 1a in accordance with some embodiments of the presently disclosed subject matter.

The presently disclosed subject matter is directed to a system and method that can be used to prepare an optical device with external branding on a first surface while also ensuring internal visibility preservation. The term "optical device" broadly refers to any device that a user and/or observer can look through and/or that includes a lens, such as (but not limited to) eyeglasses, sunglasses, storefront windows, building windows, car windshields, and the like. In some embodiments, the optical device can include multiple layers that provide functional aspects to the optical device. For example, device 5 can include image layer 10, mirrored one-way layer 15, color conversion layer 20, lens 56, and anti-reflective layer 25, as illustrated in FIGS. 1*a* and 1*b* (not necessarily drawn to scale in some embodiments). As described in detail below, the image layer displays a printed design visible to viewers from device first side 30. The mirrored one-way layer ensures that the printed image remains vibrant while keeping the internal view (e.g., the user's view) neutral. The color conversion layer balances the internal view of the user to ensure that a neutral gray tint is seen (e.g., the viewer does not see the printed design on the image layer). The anti-reflective layer provides durability and optical clarity to device 5. Advantageously, the combination of the optical device layers ensures that the printed image is fully visible and bold on the device first surface, while the view from the opposed second surface 35 (e.g., the view of the user) is uninhibited by the image (e.g., the viewer sees a gray tint and does not visualize the applied image).

As noted above, optical device 5 includes image layer 10 configured as a transparent or semi-transparent printed image applied to first surface 30, ensuring high visibility to external viewers. The term "transparent" refers to a material that has the property of transmitting visible light without appreciable scattering such that an object placed beyond the transparent material is visible (e.g., a transmittance of 80% or more). The term "semi-transparent" refers to a material that has the property of transmitting visible light with some appreciable scattering, such that an object placed beyond the semi-transparent material is at least partially visible (e.g., transmittance of between about 2-80%).

Figure 2A:
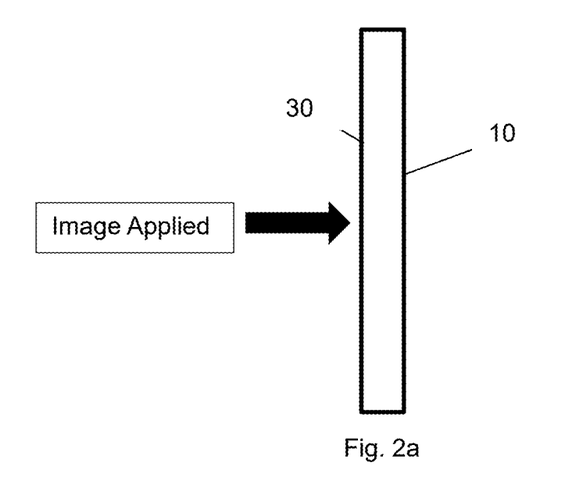
FIG. 2a is a cross-sectional view of an optical device image layer in accordance with some embodiments of the presently disclosed subject matter.
Figure 2B:
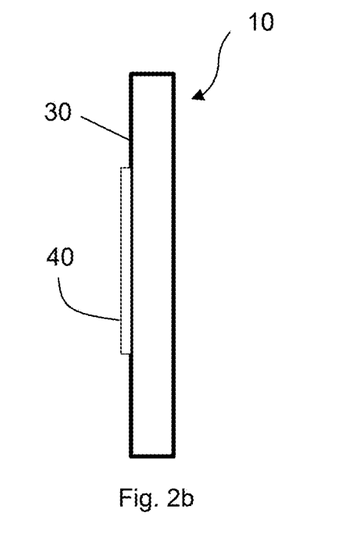
FIG. 2b is a cross-sectional view of an image layer with an applied image in accordance with some embodiments of the presently disclosed subject matter.
Figure 2C:
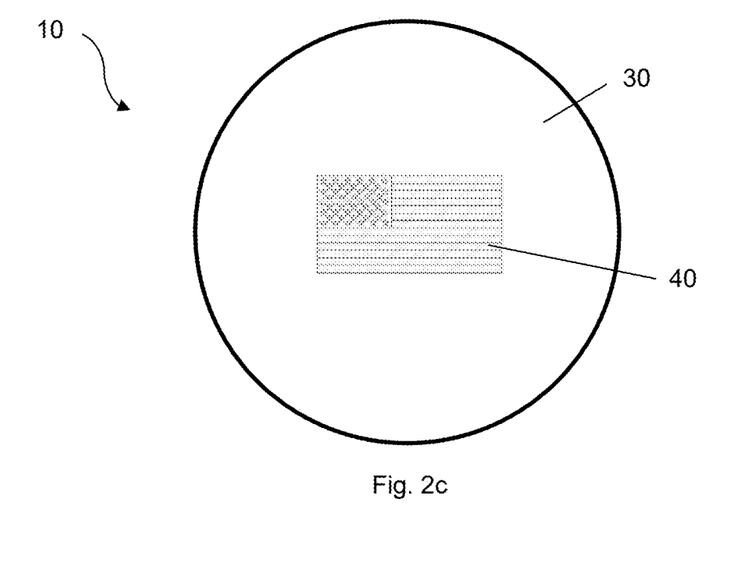
FIG. 2c is a top plan view of a first side of an optical device image layer in accordance with some embodiments of the presently disclosed subject matter.
Figure 2D:
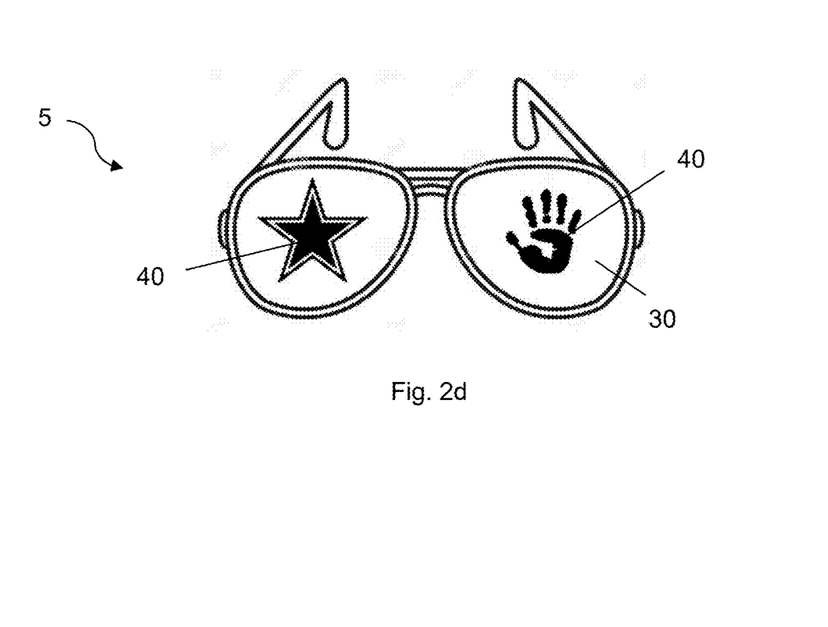
FIG. 2d is an optical device comprising an image in accordance with some embodiments of the presently disclosed subject matter.

As shown in FIGS. 2*a*-2*c*, any suitable image 40 can be applied to the first side 30 of image layer 10, such as (but not limited to) any desired name, logo, pattern, shape, message or combinations thereof. Any visible element can be used. Similarly, image 40 can include any color or combination of colors. Because image 40 is applied to first side 30 of the optical device (e.g., the viewer facing side), the image is visible to third parties facing the user. For example, if the optical device is a pair of sunglasses, people passing a user wearing the sunglasses would see the first surface of the sunglasses (and thus also would be able to see image 40), as shown in FIG. 2*d*. Stated another way, the image layer is the outward-facing printed surface of optical device 5.

Figure 2E:
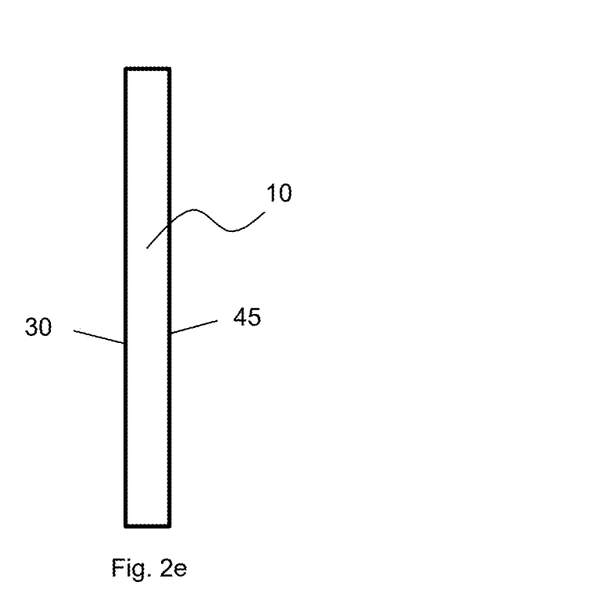
FIG. 2e is a cross-sectional view of an optical device image layer in accordance with some embodiments of the presently disclosed subject matter.

FIG. 2*e* illustrates a side plan view of the image layer, comprising first surface 30 that forms the external layer of the formed optical device. The layer also includes second side 45 that is positioned adjacent to mirrored one-way layer 15.

Image layer 10 is the outward-facing printed surface of the disclosed optical device. Because the image layer is the most visually striking layer, the ink formulation can be selected to ensure that a bold, high-contrast image is visible to external viewers, while the image also remains visually unobtrusive from the opposed side of the device. These characteristics can be achieved using transparent or translucent ink systems that allow sufficient light transmission through the image and/or image layer, while also preserving the clarity of the underlying optical layers. Thus, selecting a suitable ink type and application method for image 40 is critical to the overall functionality of the system (e.g., both image appearance and optical performance).

Image 40 can be created using any of a variety of ink formulations, each with specific benefits depending on application method, surface adhesion, and optical effect. For example, transparent dye-based inks, transparent pigment-based inks, UV-curable transparent inks, hybrid inks, or combinations thereof can be used.

Dye-based inks are made from light-absorbing dyes dissolved in liquid resin (typically water or alcohol), offering strong color while allowing light to pass through freely. Dye based inks are well suited to inkjet or screen printing on clear substrates. Dye based inks can also be layered in thin coatings to increase saturation without opacity. Please see, for example, U.S. Pat. Nos. 4,963,189 and 10,100,214, both incorporated by reference in their entireties.

Transparent pigment-based inks include finely milled pigment particles suspended in a carrier fluid, offering favorable fade resistance and color vibrancy characteristics. Pigment-based inks are slightly less light-transmissive when compared to dye-based inks but are more durable. Pigment based inks are conventionally used when outdoor exposure and longevity are important. Please see, U.S. Pat. No. 7,789,955, incorporated by reference herein. Suitable pigment inks can be selected from black, blue, red, green, yellow, orange, purple, grey, white, and the like. Any color can be used. Examples of pigment inks include (but are not limited to) Platinum® carbon black, Sailor Sieboku®, R&K Sketchinks®, HP 67 black ink, Epson EcoTank® pigment inks, VersaFine® pigment inks, Bisazo® pigment inks, Hansa® pigment inks, and the like.

UV curable transparent inks harden instantly under ultraviolet light, producing durable, scratch-resistant coatings. UV curable inks can be printed in layers to enhance color while remaining optically clean. These types of inks are ideal for mass production using digital or screen printing equipment. Please see, for example, U.S. Pat. Nos. 8,033, 660; 8,975,307; 8,911,853, all incorporated by reference herein. Examples of UV curable inks can include (but are not limited to) Mimaki® LH-100, MUH-100-Si, LF-140, LUS-120, LUS-150, LUS-170, LUS-200, LUS-210, LUS-211, S1 UV Inkjet ink, XFLEXX® flexible UV ink, Logojet® UV curable ink, HP Scitex® UV curable ink, STS Refill Technology® UV curable inks, and the like Hybrid ink formulations (e.g., one or more dyes and one or more pigments) allow for custom combinations of dye-based transparency and pigment durability. Beneficially, hybrid inks provide tunable transparency levels while optimizing adhesion and visual effect. These inks are well suited for fine logos or flag-style prints where color balance matters. Suitable hybrid inks can include (but are not limited to) Impression Obsession® hybrid inks, LDRS Creative® hybrid inks, Palette® Hybrid inks, Nuvo@ hybrid inks, and the like Image 40 can be applied to the image layer using any suitable method. For example, digital printing or screen printing techniques can be used. "Digital printing" refers to the printing of at least a portion of an image using at least one digital image printing technology. Digital printing may include (but is not limited to) laser printing, ink jet printing, dry toner electrophotographic printing, liquid toner electrophotographic printing, and the like, as would be known in the art. For example, laser printing includes the use of a laser beam to create, form, and/or produce a latent image on image layer 10. The light of the laser beam may create a charge on the image layer that may then pick up toner carrying an opposite charge. The toner may then be transferred to the image layer and the resulting print image created, formed, produced, and fused to the layer.

"Screen printing" refers to a printing technique where a mesh is used to transfer ink or dye onto a substrate, except in areas made impermeable to the ink by a blocking stencil. A blade or squeegee is moved across the screen to fill the open mesh apertures with ink, and a reverse stroke then causes the screen to touch the substrate momentarily along a line of contact. As a result, the ink wets the substrate and is pulled out of the mesh apertures as the screen springs back after the blade has passed. One color is printed at a time, so several screens can be used to produce a multi-colored image or design As described in detail below, the color conversion layer works in concert with image layer 10, neutralizing the image colors from within the interior of the optical device. Thus, light must pass through the image layer to mirrored one-way layer 15 and color conversion layer 20 without becoming cloudy, over-saturated, or reflective. Accordingly, inks used to create image 40 must be visible from the outside but transparent enough to function within the layered optical system. In some embodiments, the inks used in the image layer can have a light transmittance between about 10-60 percent (e.g., at least/no more than about 10, 20, 30, 40, 50, or 60 percent in the visible light region). The light transmittance can depend on the desired balance between external visibility and internal neutrality in some embodiments. The visible light region refers to a wavelength range of 380 to 780 μm, and the total light transmittance refers to an average value of light transmittances over the visible light region. The light transmittance for use as a measure of transparency can be calculated by the method described in JIS-K7105, namely, by measuring a total light transmittance and an amount of scattered light using an integrating sphere type light transmittance measuring apparatus and subtracting the diffuse transmittance from the total light transmittance. With respect to the flexible support, reference can be made to paragraphs [0046] to [0052] of JP2007-290369A and paragraphs [0040] to [0055] of JP2005-096108 (incorporated by reference herein).

The function of image layer 10 relies on partial visibility. Specifically, inks must be high enough in saturation to create visible, legible designs, but must also be translucent enough to allow light to continue through the lens so color conversion layer 20 can neutralize the image for the user as described below. If the inks used are too opaque, the user will see a darkened and cluttered view. If the inks are too transparent, image 40 loses contrast. The selected inks are thus selected based on how they interact with layer thickness, surface adhesion, light transmission, and/or reflectivity under sunlight or interior lighting.

The particular ink(s) selected to create image 40 can include UV stability in some embodiments. The term "UV stability" refers to the stability of the image when exposed to ultraviolet light and oxygen (e.g., when a pair of sunglasses are worn). Thus, a UV stable ink shows resistance to UV light induced degradation.

Image layer 10 can also include scratch resistance characteristics. "Scratch resistance" refers to a property of an image that undergoes a mechanical insult of a type that generally results in removal of a portion of the image. A layer having scratch resistance is characterized by removal of less material as a result of such a mechanical insult compared to a material without scratch resistance. A mechanical insult in this context can include illustratively scraping or scrubbing with an abrasive material. Scratch resistance may be measured by standard tests measuring differences in haze and/or loss of material following abrasion such as by use of a Taber Abraser and employing the Standard Test Method for Resistance of Transparent Plastics to Surface Abrasion, ASTM D1044-05, for example (incorporated by reference herein).

Optionally, the image layer can include a hydrophobic or oleophobic coating for added resistance to smudging or water damage. The term "hydrophobic" refers to a coating that is nonpolar and has little or no affinity for water and that tends to repel water. The term "oleophobic" refers to the property of having a reduced or no affinity for oils. The oleophobicity of a material can be rated as described in the Oil Rating test according to AATCC test 118-1997 (incorporated by reference herein), which evaluates a material's resistance to wetting by oil. Any suitable hydrophobic or oleophobic coating can be used, such as (but not limited to) halogenated olefin polymers and polyurethane, manganese oxide polystyrene, zinc oxide polystyrene, precipitated calcium carbonate, carbon-nanotubes, silica nano-coating, polytetrafluoroethylene, silicon, and various flouropolymers, polyols, organosiloxanes, organosilanes, alkylcarboxylic acids, alkylsulfonates, organophosphates, organophosphonates, fluoropolymers, fluorosurfactantsor combinations thereof.

Any suitable method can be used to apply a hydrophobic or oleophobic coating to image layer 10. For example, a hydrophobic coating can be applied using an immersion process through vapor deposition. The immersion technique can include the steps of immersing the lens in a coating solution and allowing a hydrophobic layer to attach to the object through electrostatic interactions or chemical reactions. For example, a lens can be coated with a hydrophobic material by immersing it in a hydrophobic solution and then withdrawing it after a certain interval under controlled temperature and/or atmospheric conditions. The coating quality can be controlled at least in part by the immersion time, the temperature of the process, and/or the content of the solution.

Figure 3A:
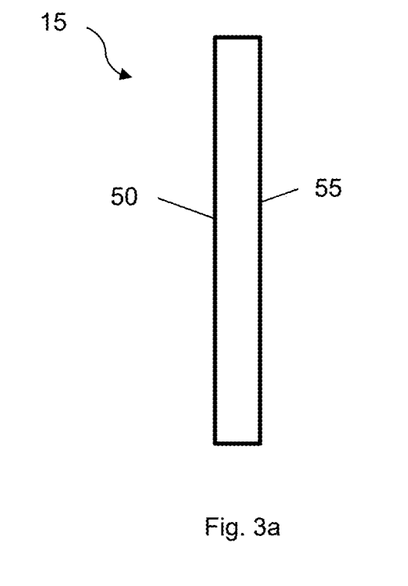
FIG. 3a is a cross-sectional view of an optical device one-way mirrored layer in accordance with some embodiments of the presently disclosed subject matter.
Figure 3B:
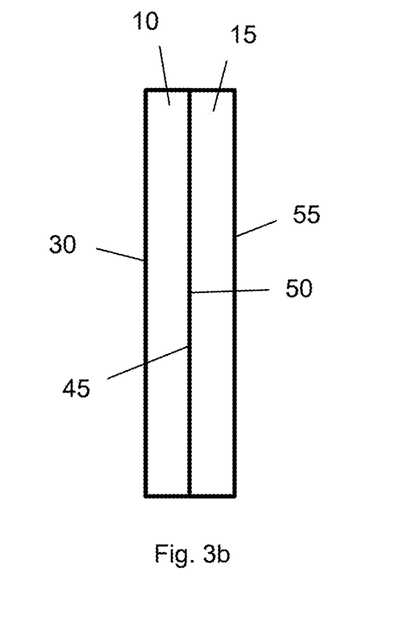
FIG. 3b is a cross-sectional view of an optical device image layer and one way mirrored layer in accordance with some embodiments of the presently disclosed subject matter.

As noted above, mirrored one-way layer 15 is positioned directly adjacent to the image layer and includes a partially reflective layer that prevents external viewers from seeing the third layer. As shown in FIG. 3a, mirrored one-way layer 15 includes first and second sides 50, 55. First side 50 is positioned directly adjacent to second side 45 of the image layer, as illustrated in FIG. 3b. The second side of the mirrored one-way layer is positioned directly adjacent to the color correcting layer, as discussed below. The mirrored one-way layer ensures that external viewers of the optical device see only the image layer and not the internal optical process beneath it. The mirrored one way layer darkens the wearer's view slightly but does not interfere with color processing.

The term "mirrored" refers to the characteristic of producing an image by specular reflection of radiation in the UV, VIS, or IR regions of the spectrum (e.g., a visible light reflective surface). The term "one-way" refers to the characteristic of a layer where only one side (e.g., side 50 is mirrored and the second side 55 is not mirrored).

Thus, mirrored one way layer 15 is a critical component that ensures image 40 remains vibrant to external viewers viewing from first surface 30, while also keeping the internal view neutral (e.g., a user's view from second surface 35). The mirrored one way layer prevents external viewers from seeing the internal color conversion process by enhancing the external appearance without interfering with the wearer's vision.

The mirrored one way layer includes a dielectric mirror coating in some embodiments. The term "dielectric mirror" refers to is a type of mirror that includes multiple thin layers of dielectric material, typically deposited on a substrate of glass or some other optical material (e.g., a lens). Suitable dielectric materials can include (but are not limited to) indium tin oxide, aluminum tin oxide, indium zinc oxide, fluorine-doped tin oxide, poly(3,4-ethylenedioxythiophene) (PEDOT), germanium oxide, antimony oxide, bismuth oxide, magnesium oxide, aluminum oxide, silicon oxide, titanium oxide, silicon carbonitride, silicon nitride, silicon oxynitride, silver, and mixtures thereof.

The mirrored one-way layer is thus configured to partially reflect light incident on the exterior side of the lens. This coating or layer can be partially reflective and partially transmissive (e.g., at least/no more than about 30, 40, 50, 60, 70, 80 percent reflective or transmissive) such that the user does not see the reflected light. For example, the layer can be treated with a metallic coating, such as chromium or aluminum, using a vacuum coating machine, thereby creating a functional layer that partially reflects and transmits light. In addition to providing a partially mirrored surface, the dielectric coating can provide additional strength and durability to the one-way mirrored layer. "Transmissive" refers to a material that transmits at least 70% of an incident light of a given wavelength).

In some embodiments, the dielectric mirrors use stacked transparent materials to reflect specific wavelengths while allowing others to pass through. By selecting which transparent materials to use, the dielectric mirror can be adjusted to be highly reflective or partially transparent based on the number of layers and material composition.

Further, the dielectric mirror coating ensures that the mirrored one way layer is lightweight and durable compared to traditional mirrored coatings.

Using a coated optical film instead of depositing materials directly onto a lens allows for maximum efficiency. Further, the materials can be mass produced by manufacturing in large sheets instead of applying directly to individual lenses.

In some embodiments, mirrored one-way layer 15 can be produced using thin-film deposition techniques, such as Physical Vapor Deposition (PVD) or Sputtering. PVD broadly includes a variety of vacuum deposition methods to produce thin films and coatings on substrates including metals, ceramics, glass, and polymers. PVD is characterized by a process in which the material transitions from a condensed phase to a vapor phase and then back to a thin film condensed phase. Sputtering is a process in which a solid target material is used for ejecting particles as a result of an impact of the target by high energetic particles. Advantageously, the noted production methods allow the layer to be manufactured at scale without the need for direct deposition onto the lenses, making production more flexible.

The level of reflectivity in the dielectric mirror layer must be precisely tuned to balance the external image brightness while maintaining a neutral internal view. "Reflectivity" refers to an optical property of a material describing what portion of incident light is reflected from the material. In some cases, reflectivity (R) is defined as a ratio between an intensity of reflected light (IR) and an intensity of incident light (II), (R=IR/II). For example, the layer can include a high level of reflectivity (about 60% or more), creating a strong mirrored look and making image 40 bold and vivid but reducing some light transmission. In some embodiments, the layer can include a moderate reflectivity (about 40-50%) to keep the image sharp and visible while allowing more see-through capability for the wearer. In some embodiments, the layer can have low reflectivity (about 20-30%), appearing as a light tint rather than a full mirror, making the effect more subtle but still visible. In some embodiments, a suitable reflectivity range can be about 40-50% to ensure the image appears strong while keeping the interior view comfortable.

The reflectivity of the one way mirror layer can be adjusted as needed based on user color choice. For example, some colors in image 40 may require slight modifications to the reflectivity percentage to ensure maximum brightness and clarity. Specifically, lighter colors (e.g., yellow, light blue, white) naturally appear brighter, while darker colors may need adjustments to increase visibility.

Figure 3C:
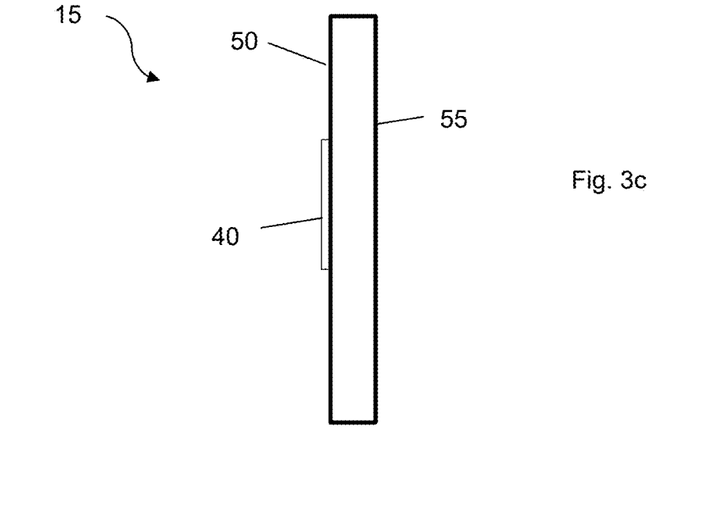
FIG. 3c is a cross-sectional view of a one way mirrored layer comprising an image in accordance with some embodiments of the presently disclosed subject matter.

In some embodiments, the image 40 can be printed directly onto the mirrored one-way layer, combining both functions into a single optical film. In these embodiments, the image layer is not required, as shown in FIG. 3c. Thus, the image layer can be omitted in some embodiments (or the image layer can be combined with the mirrored one-way layer).

Figure 4A:
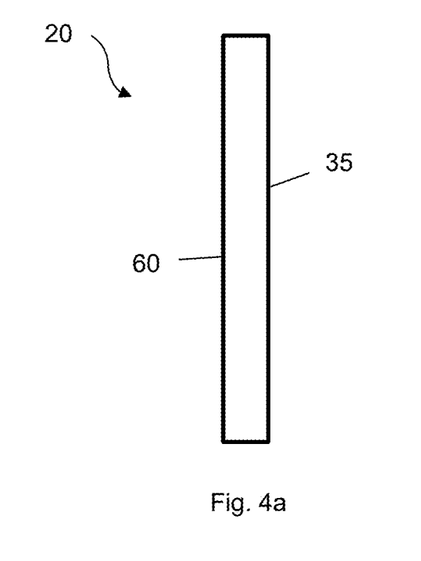
FIG. 4a is a cross-sectional view of an optical device color conversion layer in accordance with some embodiments of the presently disclosed subject matter.
Figure 4B:
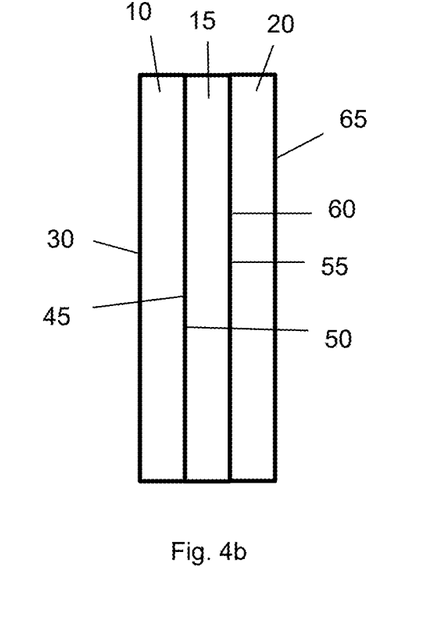
FIG. 4b is a cross-sectional view of an optical device image layer, one way mirrored layer, and color conversion layer in accordance with some embodiments of the presently disclosed subject matter.
Figure 4C:
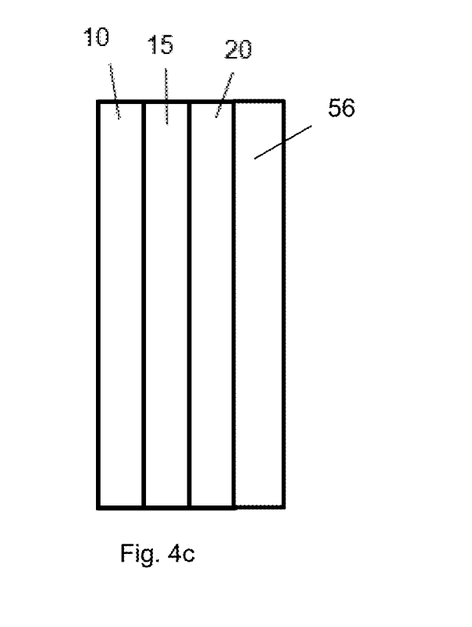
FIG. 4c is a cross-sectional view of an optical device image layer, one way mirrored layer, color conversion layer, and a lens substrate in accordance with some embodiments of the presently disclosed subject matter.
Figure 4D:
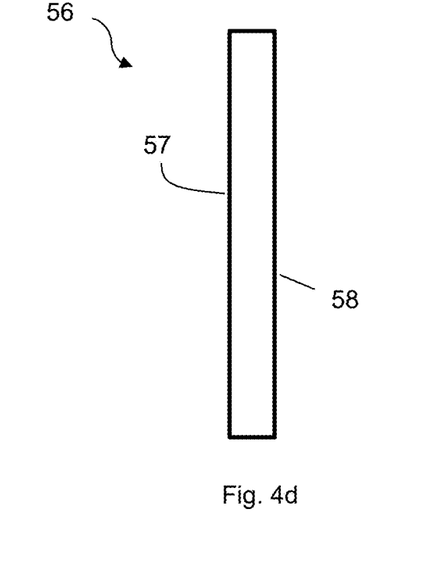
FIG. 4d is a cross-sectional view of a device lens substrate in accordance with some embodiments of the presently disclosed subject matter.
Figure 4E:
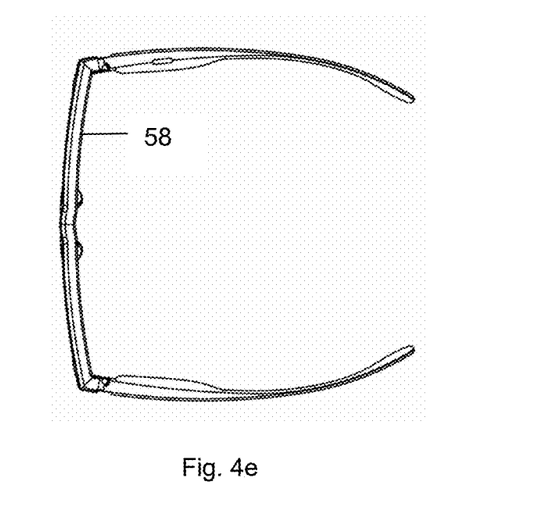
FIG. 4e is a top plan view of an optical device illustrating a lens second side in accordance with some embodiments of the presently disclosed subject matter.

Optical device 5 also includes color conversion layer 20, as noted above. As shown in FIG. 4a, the color conversion layer includes first and second sides 60, 65. First side 60 is positioned directly adjacent to second side 55 of the one way mirrored layer, as illustrated in FIG. 4b. The second side of the color conversion layer is positioned directly adjacent to an associated lens 56, as shown in FIG. 4c. The term "lens" includes the lenses of a pair of sunglasses or eyeglasses. The term can also include the glass or other materials used in an associated window (e.g., a commercial store window). The lens can include glass, silicon, plexiglass, polymeric material, and the like. In some embodiments, the lens is fully or partially transparent (e.g., at least/no more than about 30, 35, 40, 45, 50, 55, 60, 65, 70, 75, 80, 85, 90, 95, 99, or 100 percent transparent). Lens 56 can include first and second sides 57, 58, respectively, as shown in FIG. 4d. The first lens side is positioned adjacent to the second side of the color conversion layer, as noted above. The second lens side is the user-facing side of the lens (e.g., positioned closest to the individual wearing the glasses), as shown in FIG. 4e. With regard to the glass of a store window, the user-facing side is the inside from the viewpoint of a person within the interior of a store or vehicle. The person peering through the glass to the interior of a store, for example, would view image 40 while the user does not see the image. As described below, second side 58 of the lens can include the anti-reflective layer. Lens 56 can have any shape (e.g., circular, oval, square, rectangular) and any suitable thickness (e.g., 0.01 to 5 inches or more). Thus, the lens can have a thickness of at least about (or no more than about) 0.01, 0.1, 0.5, 1, 1.5, or 2 inches) in some embodiments.

Color conversion layer 20 is a precisely calibrated optical film that transforms the colors from image layer 10 into a predetermined uniform tint for the user (e.g., when the sunglasses are worn). Each color in the image layer has a corresponding additive color in the color conversion layer. Specifically, each additive color can be selected to ensure that the wearer sees a predetermined, consistent, and neutral tint across the entire lens, just like a pair of standard sunglasses. Stated another way, the additive color of the color conversion layer neutralizes image 40 when viewed from the user's side of device 5. The balancing process ensures that no image distortion or variation appears from the inside-only a consistent sunglass shade.

Color conversion layer 20 also includes the use of transparent or semi-transparent inks or films. Since the wearer's view results from seeing the image layer and the color conversion layer blended together, light must pass through both layers. To produce the desired uniform tint, additive colors 41 in the color conversion layer are visible through the image layer without introducing distortion or blockage. As with the image layer, these materials must provide precise color values, excellent light transmission, and visual clarity. The additive colors deposited on the color conversion layer in the same size and shape as image 40. However, the colors in the additive color portion are selected to neutralize the colors of image 40. As such, when the image and additive color 41 are overlayed (e.g., by looking through the second surface of the optical device), the additive color neutralizes the color(s) in the image such that the image disappears from view.

The color conversion layer therefore transforms the colors of image 40 on image layer 10 to a uniform color for the wearer. The additive colors are precisely calibrated to achieve the result. Thus, the color conversion layer balances the colors from the image layer by applying a precisely calculated additive color 41 that transforms image 40 when viewed from the inside, thereby neutralizing the image and removing it from view. For every color included in image 40, there is a corresponding additive color 41 on the color conversion layer. When combined (e.g., aligned in device 5), the colors create a predetermined uniform tint across the entire lens. As a result, no pattern, distortion, or variation appears to the user when looking through device 5 (e.g., from the device second side 35 only). Instead, the user only sees the effect of standard glass shading. Thus, the colors of image 40 are transformed in a controlled manner using the color conversion layer additive colors 41 to maintain a seamless visual experience (e.g., the wearer's view remains completely uninterrupted and the image is not seen).

For example, to display an American flag on the front of the glasses, surrounded by a light blue background, the colors of the image in image layer 10 are precisely balanced by the additive colors in color conversion layer 20 to ensure that the wearer sees only a neutral tint. In some embodiments, the colors of the image can be balanced by additive colors 41 as set out in Table 1:

| Image Color Layer | RGB Value (Image Layer Color) | Additive Color | RGB Value (Additive Color) | Resulting Perceived Color (Final RGB + Description) |
|---|---|---|---|---|
| Red (flag stripe) | 255, 0, 0 | Cyan | 1, 255, 255 | (128, 128, 128) Light Gray |
| White (flag stripe) | 255, 255, 255 | Near-black Gray | 1, 1, 1 | (128, 128, 128) Light Gray |
| Blue (flag field) | 0, 0, 255 | Yellow | 255, 255, 1 | (128, 128, 128) Light Gray |
| Light blue (background) | 86, 160, 211 | Soft Orange | 170, 96, 45 | (128, 128, 128) Light Gray |
| White (stars) | 255, 255, 255 | Near-black Gray | 1, 1, 1 | (128, 128, 128) Light Gray |

The image layer colors refer to the various colors of image 40 of the image layer. "RGB" the RGB color model, an additive color model in which the red, green, and blue primary colors of light are added together in various ways to reproduce a broad array of colors. Thus, an RGB value refers to brightness and is expressed by an integer. Generally, R, G and B each have 256 levels of brightness, which are expressed by numbers as 0, 1, 2 . . . 254, 255. For example, black is (0,0,0) corresponding to a numerical value of 0, and white is (255,255,255). "Additive color" refers to the color in the color conversion layer to balance a corresponding color in image 40. For example, red in the image is balanced by cyan in the color conversion layer, white in the image layer is balanced by near-black gray in the color conversion layer, and so forth. As a result, the image is visible only on device first side 30, not second side 35. The Resulting Perceived Color refers to the RGB value and description when the image layer color and additive color are overlayed.

Figure 5A:
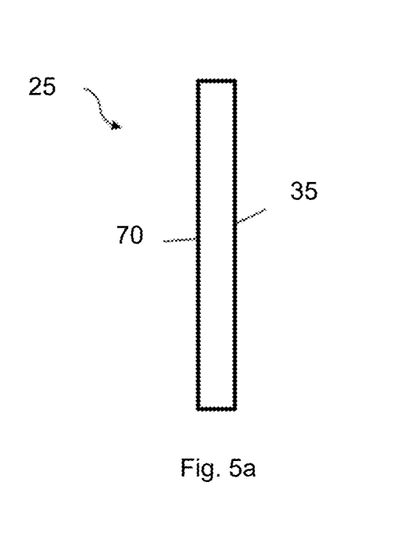
FIG. 5a is a cross-sectional view of an optical device anti-reflective layer in accordance with some embodiments of the presently disclosed subject matter.
Figure 5B:
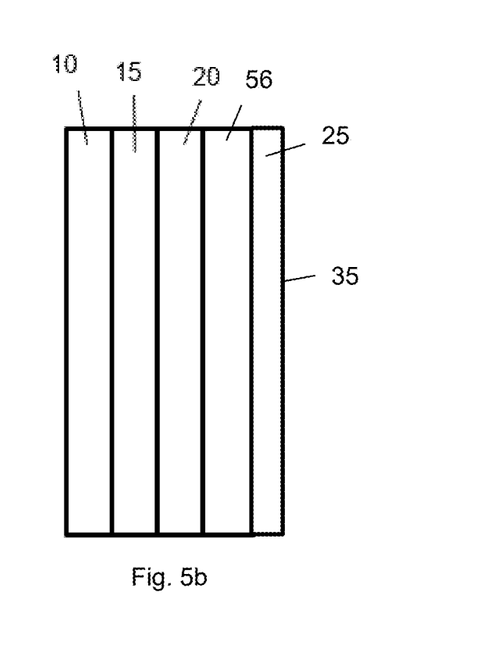
FIG. 5b is a cross-sectional view of an optical device comprising a lens in accordance with some embodiments of the presently disclosed subject matter.

Optical device 5 also includes anti-reflective layer 25, as noted above. As shown in FIG. 5a, the anti-reflective layer includes first and second sides 70, 35. First side 70 is positioned directly adjacent to second side 58 of lens 56, as shown in FIG. 5b. The second side of the anti-reflective layer functions as the second surface of the optical device. Thus, the anti-reflective layer is applied to the second (e.g., rear) side of the lens substate and is the only film or coating on the user's side, eliminating internal reflections and glare. The anti-reflective layer is applied to the second side of the lens (e.g., the user or wearer facing side of the lens). Stated another way, the anti-reflective layer forms the innermost layer of the disclosed device and system and is the only film applied to the second side of the lens. The lens therefore acts as a physical and optical divider between the display side and the viewing side of device 5.

The anti-reflective layer provides durability and optical clarity. Specifically, the layer eliminates internal reflections and prevents backlighting from making the color conversion layer visible to the wearer. The anti-reflective layer ensures that optical device 5 provide a seamless, natural viewing experience, preventing unwanted glare, color artifacts, and ghost images. Color artifacts are defects in an image that appear as a result of the technology used to process the image. Ghost images are visual phenomena where a faint, residual image of an object persists after the object has been removed from view, typically caused by reflections within an optical component.

In some embodiments, a lens receives an anti-reflective coating through vapor deposition. However, other processes could be used, including chemical vapor deposition, directed vapor deposition, vapor deposition using magnetron sputtering, vapor deposition using plasma polymerization, another deposition technique, or any combination of deposition techniques.

The anti-reflective layer can include any suitable material. For example, the anti-reflective layer can include (but is not limited to) magnesium fluoride, silicon dioxide, tantalum pentoxide, zinc sulfide, titanium dioxide, aluminum oxide, PTFE (polytetrafluoroethylene or polytetrafluoroethene), perfluoroalkoxy polymer resin (PFA), (fluorinated ethylene-propylene) (FEP), tantalum aluminum alloys, tungsten silicon nitride 15 alloys, tantalum nitride alloys, nickel, nickel alloys, titanium nitride alloys, or combinations thereof.

Figure 5C:
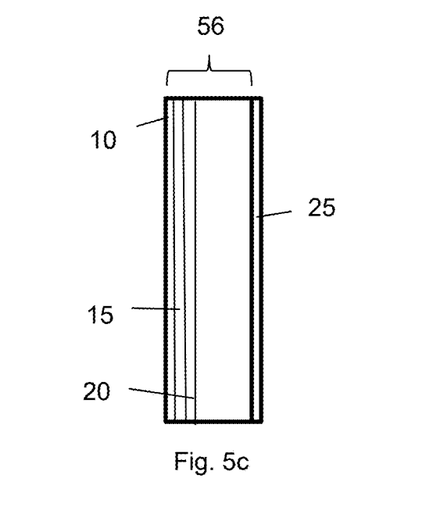
FIG. 5c is a cross-sectional view of an optical device lens comprising a plurality of embedded layers in accordance with some embodiments of the presently disclosed subject matter.

In some embodiments, each layer of device 5 is applied as a layer positioned adjacent to lens 56. For example, image layer 10, mirrored one-way layer 15, color conversion layer 20 can be applied as a layer adjacent to lens 56, as shown in FIG. 5b. Alternatively, each of the layers can be embedded within or laminated inside lens 56 rather than applied externally, as illustrated in FIG. 5c. The term "embedded" refers to a component that is surrounded by and/or secured within another component. The term "laminated" refers to layered structures in which layers 10, 15, 20 and/or 25 and lens 56 are separated by an adhesive interlayer extending across substantially the entire interface between adjacent layers and/or a surface of the lens and a layer.

Each layer of the optical device can have any desired shape. For example, the first and second surfaces of each layer can be a convex surface and a concave surface. In other embodiments the first and second surfaces of each layer are horizontal or vertical (or angled anywhere in between horizontal and vertical). A variety of lens configurations in both horizontal and vertical planes are possible.

Each layer of optical device 5 can have any suitable thickness. The term "thickness" refers to the distance between the opposed first and second faces of a layer. In some embodiments, each layer has thickness of 0.1-10 mm (e.g., at least/no more than about 0.1, 0.5, 1, 2, 3, 4, 5, 6, 7, 8, 9, or 10 mm). However, the presently disclosed subject matter is not limited and the thickness of each layer can be greater or less than the range given above.

In certain embodiments, reducing the thickness of the mirror layer may improve optical performance by minimizing the distance between the image layer and the color conversion layer. When these layers are positioned in close proximity, their visual effect fuses more completely, resulting in a more uniform and neutral internal tint as perceived by the wearer. For example, mirror layers may be constructed from coated optical films such as PET or TAC, typically ranging from 25 to 250 microns in thickness. Very thin films (e.g., 25-75 microns) may be used when optical blending and minimal layer separation are desired, provided that reflectivity and light transmission characteristics are within the desired operational range.

Figure 6:
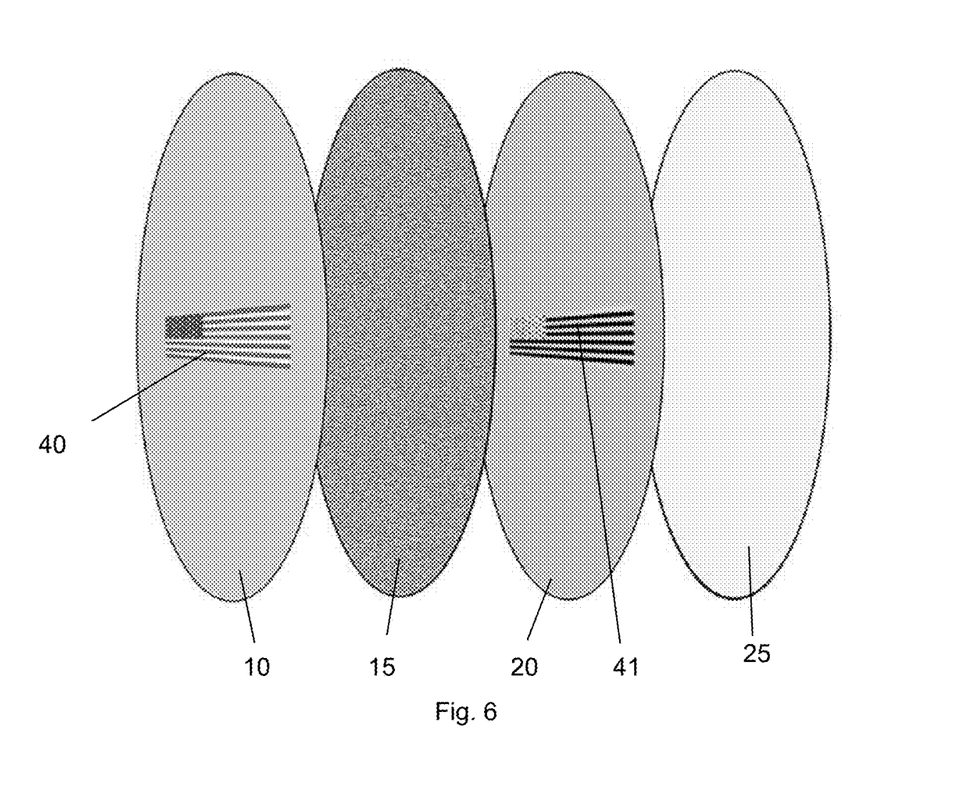
FIG. 6 is a perspective view of the layers of an optical device laminate in accordance with some embodiments of the presently disclosed subject matter.

The image layer, mirrored one-way layer, color conversion layer, and the anti-reflective layers can be joined as a laminate to create optical device 5, as shown in FIG. 6. Any method can be used to create the laminate, such as (but not limited to) the use of adhesives, thermal welding, fusing, pressure sensitive adhesives, polyurethane adhesives, electrostatic attraction, thermoforming, other types of adhesives, materials curable by ultraviolet light, thermally curable materials, radiation-curable materials, and combinations thereof.

In use, optical device 5 produces a brightening effect of lighter colors through internal reflection. Specifically, light naturally strikes the printed external image 40 from the outside, passing through the layers of the device. Some of the light passes through image 40, reaches mirrored one way layer 15, and is reflected back through the image, creating a secondary light source from within the lens or window. Lighter colors, such as yellow, light green, and light blue, experience a dual-illumination effect, appearing brighter and more vivid (e.g., neon-like in some embodiments). The effect is even more dramatic when applied across the entire optical device (e.g., all layers), making the external branding of image 40 even more eye-catching when viewed by the outside (e.g., first side 30).

Figure 7A:
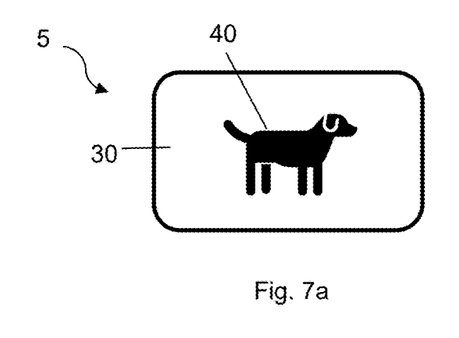
FIG. 7a is a first surface of an optical device illustrating an image in accordance with some embodiments of the presently disclosed subject matter.
Figure 7B:
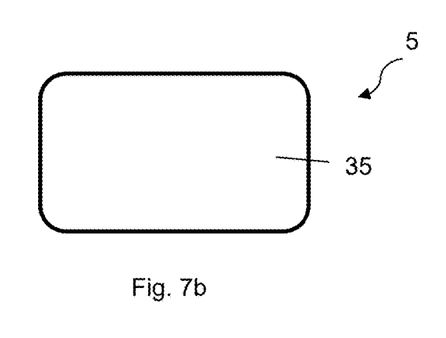
FIG. 7b is a second surface of the optical device of FIG. 7a in accordance with some embodiments of the presently disclosed subject matter.

Advantageously, optical device 5 includes a unique arrangement of layers that allows image 40 to be viewed from first surface 30 of the device only, as shown in FIG. 7a. The mirrored one-way layer and color conversion layer cooperate and ensure that additive color(s) 41 effectively neutralize the image when the device is viewed from second surface 35, as shown in FIG. 7b. The mirrored one-way layer reflects only the image layer's colors to the outside world, concealing the internal color conversion layer. External viewers see only the intended image. The wearer, however, sees the combined effect of the image and color conversion layers that have been optically matched to produce a neutral or gray field. Such selective visual split allows for full image visibility externally, while the wearer perceives no image at all.

It should be appreciated that the presently disclosed subject matter is not limiting. For example, in some embodiments, the optical device can include image layer 10 and mirrored one-way layer 15 combined into a single printed reflective film, reducing the number of separate layers while maintaining outward visibility and internal neutrality. In these embodiments, the device includes three layers (the combined image and one-way mirror layer, the color correcting layer, and the anti-reflective layer). Another possible variation involves directly printing the image 40 onto a lens surface, using transparent or semi-transparent inks to achieve the desired effect without the need for applied films.

Additionally, the optical layers can be embedded within the lens structure itself, laminated between optical substrates rather than applied externally.

The presently disclosed subject matter includes many advantages over currently used optical devices (e.g., lenses, storefront windows). Specifically, the system is a new approach to layered optical processing for branding-enabled eyewear and transparent displays.

The dielectric layer in the one way mirror layer allow the optical device to have better control over reflection and light transmission. Further, the layer can be fine-tuned to maximize visibility while keeping the internal view neutral.

In some embodiments, the image layer and/or the color conversion layer may be applied directly to one or more existing lens treatments or functional films, rather than existing as discrete, standalone layers. For example, the image layer may be printed or embedded onto an exterior-facing anti-scratch coating, UV-protective coating, or other optically clear layer. Similarly, the color conversion layer may be printed onto or integrated with a polarization film, optical filter, or internal lens treatment, provided that it remains optically positioned behind the mirror layer and functions to neutralize or balance the image layer as described. This arrangement allows for reduction in overall layer count and simplifies manufacturing, while maintaining the intended visual effect and performance characteristics of the invention.

Unlike metallic coatings, dielectric layers do not oxidize or degrade over time, providing added durability to the disclosed optical device.

The effect produced by the one-way mirror layer is purely optical, such that no batteries, screens, or smart glass technology is required.

The one way mirror layer allows for a customizable level of reflection for optimizing image clarity.

One way mirror layer 15 provides a durable, long-lasting optical effect without degradation.

The one way mirror layer allows a user to create vivid and bold images on the first side of the optical device while maintaining a neutral view on the opposed second side of the device.

The disclosed technology can be used to create a wide variety of optical devices, including reading glasses, sunglasses, fashion eyewear, store windows, automobile windows, and the like. The optical devices advantageously can display image 40 when the first side 30 of the device is viewed (e.g., onlookers peering into a store window). However, when the device is viewed from second side 35, the image is not visible and a standard store window is viewed. In this way, stores and other users can display any desired outwardly-facing image 40 to viewers (e.g., logos, names, quotes, information). Thus, the system can be used with storefront and building/home windows to create high visibility branding and/or advertising without affecting interior lighting or visibility within the building or home interior. The disclosed system can be used with automotive windshields and windows to allow branding or promotional imagery on commercial and personal vehicles without obstructing the view of the driver or passengers.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. An optical device comprising: an image layer defined by a first side that is the first surface of the optical device and an opposed second side, wherein an image is printed on the image layer first side; a mirrored one-way layer defined by a first side positioned adjacent the image layer second side, and an opposed second side, wherein the mirrored one-way layer comprises a dielectric mirror coating; a color conversion layer defined by a first side positioned adjacent to the second side of the mirrored one-way layer, and a second side, wherein the color conversion layer comprises an additive color in the same size and shape as the image to neutralize the image; and a lens with a first side and an opposed second side, wherein the first side of the lens is positioned adjacent to the second side of the color conversion layer; an anti-reflective layer defined by a first side positioned adjacent to the second side of the lens, and a second side that is the second surface of the optical device; wherein the image is visible from the first surface of the optical device; and wherein the image is neutralized by the additive color and is not visible from the second surface of the optical device.

2. The optical device of claim 1, selected from eyeglasses, sunglasses, windows, automobile windshields, or automobile windows.

3. The optical device of claim 1, wherein the image comprises transparent or semi-transparent ink.

4. The optical device of claim 3, wherein the transparent or semi-transparent ink is selected from transparent dye-based inks, transparent pigment-based inks, UV-curable transparent inks, hybrid inks, or combinations thereof.

5. The optical device of claim 4, wherein the inks are UV stable inks.

6. The optical device of claim 1, wherein the image is a screen printed or digital printed image.

7. The optical device of claim 1, wherein the first side of the image layer includes one or more coatings selected from a scratch resistant coating, a hydrophobic coating, an oleophobic coating, UV resistant coating, or combinations thereof.

8. The optical device of claim 1, wherein the dielectric mirror coating comprises indium tin oxide, aluminum tin oxide, indium zinc oxide, fluorine-doped tin oxide, poly(3,4-ethylenedioxythiophene) (PEDOT), germanium oxide, antimony oxide, bismuth oxide, magnesium oxide, aluminum oxide, silicon oxide, titanium oxide, silicon carbonitride, silicon nitride, silicon oxynitride, or combinations thereof.

9. The optical device of claim 1, wherein the mirrored one-way layer has a reflectivity range of about 40-50 percent.

10. The optical device of claim 1, wherein the additive color comprises transparent or semi-transparent ink.

11. The optical device of claim 1, wherein the additive color overlayed with the image creates a uniform tint.

12. The optical device of claim 1, wherein each layer has a thickness of about 0.1-10 mm.

13. The optical device of claim 1, wherein the image layer, one way mirror layer, color conversion layer, and anti-reflective layer are embedded within or laminated inside the lens.

14. A method of providing a visual image on a first surface only of an optical device, the method comprising:
    printing an image on the first surface of the optical device of claim 1;
    wherein the image is visible on the first surface; and
    wherein the color conversion layer prevents the image from being visible on the second surface of the optical device.

15. The method of claim 14, wherein the optical device is selected from eyeglasses, sunglasses, windows, automobile windshields, or automobile windows.

16. The method of claim 14, wherein the image comprises transparent or semi-transparent ink.

17. The method of claim 14, wherein the image is a screen printed or digital printed image.

18. The method of claim 14, wherein the first side of the image layer includes one or more coatings selected from a scratch resistant coating, a hydrophobic coating, an oleophobic coating, UV resistant coating, or combinations thereof.

19. The method of claim 14, wherein the dielectric mirror coating comprises indium tin oxide, aluminum tin oxide, indium zinc oxide, fluorine-doped tin oxide, poly(3,4-ethylenedioxythiophene) (PEDOT), germanium oxide, antimony oxide, bismuth oxide, magnesium oxide, aluminum oxide, silicon oxide, titanium oxide, silicon carbonitride, silicon nitride, silicon oxynitride, or combinations thereof.

20. The method of claim 14, wherein the additive color overlayed with the image creates a uniform tint from the second surface of the optical device.

* * * * *